(12) United States Patent
Sidorovich

(10) Patent No.: US 6,965,713 B2
(45) Date of Patent: Nov. 15, 2005

(54) OPTICAL BEAM GENERATING AND SHAPING DEVICE

(75) Inventor: Vladimir Sidorovich, Moscow (RU)

(73) Assignee: Meklyn Enterprises Limited, Larnaca (CY)

( * ) Notice: Subject to any disclaimer, the term of this patent is extended or adjusted under 35 U.S.C. 154(b) by 65 days.

(21) Appl. No.: 10/372,762

(22) Filed: Feb. 25, 2003

(65) Prior Publication Data
US 2003/0228098 A1 Dec. 11, 2003

(30) Foreign Application Priority Data
Jun. 5, 2002 (RU) ............... 2002114691

(51) Int. Cl.[7] ............... G02B 6/26; G02B 6/32
(52) U.S. Cl. ............... 385/31; 385/32; 385/33
(58) Field of Search ............... 385/31, 32, 33

(56) References Cited

U.S. PATENT DOCUMENTS

| | | | |
|---|---|---|---|
| 4,865,409 A | 9/1989 | Althaus et al. | |
| 4,934,787 A | 6/1990 | Ichimura et al. | |
| 4,960,315 A | 10/1990 | Kostal et al. | |
| 4,998,792 A | 3/1991 | Boerstler et al. | |
| 5,062,150 A | 10/1991 | Swanson et al. | |
| 5,892,866 A | 4/1999 | Bristow et al. | |
| 6,266,723 B1 | 7/2001 | Ghodrat et al. | |
| 6,348,986 B1 | 2/2002 | Doucet et al. | |
| 6,532,244 B1 * | 3/2003 | Dewey et al. | 372/29.014 |
| 6,788,901 B2 | 9/2004 | Sidorovich et al. | |
| 6,795,655 B1 | 9/2004 | Sidorovich et al. | |
| 6,819,849 B1 * | 11/2004 | Tangonan et al. | 385/126 |
| 6,829,439 B1 | 12/2004 | Sidorovich et al. | |
| 2003/0011850 A1 | 1/2003 | Sidorovich et al. | |
| 2003/0035182 A1 | 2/2003 | Sidorovich et al. | |
| 2003/0228098 A1 | 12/2003 | Sidorovich | |

FOREIGN PATENT DOCUMENTS

| | | |
|---|---|---|
| EP | 1 162 770 A2 | 12/2001 |
| JP | 58-202402 | 11/1983 |
| JP | 60-178409 | 9/1985 |
| JP | 10-10354 | 1/1998 |
| WO | WO 99/24856 | 5/1999 |

OTHER PUBLICATIONS

Dominion Lasercom Inc. advertising brochure, Digital Audio Digital Infrared Data (David), 2002, 2 pages.

* cited by examiner

*Primary Examiner*—John R. Lee
*Assistant Examiner*—Paul M. Gurzo
(74) *Attorney, Agent, or Firm*—McDermott, Will & Emery LLP

(57) ABSTRACT

A beam generating and shaping device, for use in a free-space optical communication system provides increased uniformity in the distribution of optical radiation power, both at the output of the device and the aperture of the receiving terminal. A source provides optical radiation bearing communication information, and an optical coupler introduces radiation from the source into a multimode optical fiber, for example at an inclined angle, so as to launch a number of modes within the fiber. A mode mixer engages a portion of the multimode optical fiber. An exemplary mode mixer consists essentially of a single clamp, providing micro-bending of the fiber. An optical antenna is coupled to the cross-section formed by the distal end of the multimode optical fiber, for example, via an auxiliary lens to provide increase in output radiation beam divergence. The telescope transmits radiation emitted from the distal end of the multimode optical fiber over a free-space optical link towards the receive aperture.

19 Claims, 6 Drawing Sheets

OPTICAL BEAM GENERATING AND SHAPING DEVICE

TECHNICAL FIELD

The present subject matter is related to optics, and may be used in free-space optical communication systems.

BACKGROUND

One of the problems encountered in development of optical communication systems is the necessity to create uniform optical intensity distribution across the beam transmitted along the communication path, as well as uniform distribution of optical radiation power among the components of the beam angular spectrum (see, for example, U.S. Pat. No. 5,892,866 to Bristow et al.).

If a multimode optical fiber coupled to a telescope is used in the output beam shaping device, the above problem may be solved by transformation of the initial beam from a radiation source into a multitude of fiber modes with a uniform distribution of radiation power between the modes, by means of various technical solutions.

Uniform distribution of power between modes provides average uniformity of intensity distribution in the beam cross-section and over its angular spectrum. It should be noted however, that when modes are excited in a multimode optical fiber, a fine-structure nonuniformity of intensity distribution across the fiber is observed, which is caused by inter-mode interference (what is known as "speckles").

Speckles can not be avoided by uniform excitation of fiber modes. But if speckles in a receive aperture plane of a remote receive terminal could be made small enough compared to the aperture, it is sufficient to achieve average (averaged over speckles) uniformity of the intensity distribution to ensure stable operation of a communication system. Prior art techniques, however, have been ineffective and/or impractical for uniform excitation of fiber modes as well as for averaging speckles out by the receive aperture, particularly for use in free-space optical communications.

The intent of this patent application is to provide average uniformity of the intensity distribution in a receive aperture plane as well as to eliminate influence of speckles on optical communication system operation.

PRIOR ART

U.S. Pat. No. 6,366,723 Medved et al. discloses a device forming an optical beam for a free-space communication system where a multimode fiber optically coupled to an objective lens is used without the means providing uniform excitation of modes in the fiber. At the output of a multimode fiber where modes are not excited uniformly, a non-uniform intensity distribution is typically observed over the fiber cross-section as well as over optical radiation angular spectrum. This drawback prevents efficient use of a multimode fiber in a beam shaping device proposed in Medved et al., as in such implementation of the device intensity distribution in a remote receive aperture plane is characterized by non-stationary large scale non-uniformity, causing significant optical signal scintillation at a photodetector input.

It is proposed in the Medved et al. patent to decrease the scintillation by using "clusters" of beam shaping devices, which makes the system bulky, expensive and difficult to install and operate. Besides that, large scale intensity uniformity in a receive aperture plane, while decreasing scintillation, generally speaking, does not ensure a decrease of noise caused by speckles at a photodetector input to allowable level.

Also, it is believed that angular spectrum intensity non-uniformity at a multimode fiber output would cause a highly non-uniform intensity distribution at an objective lens of any beam shaping device used in the Medved et al. system. This effect restricts total optical power that may be transmitted through a beam shaping device without violation of eye-safety standards. Such standards impose limitation on maximum permissible output power level averaged over any circle with a 7 mm diameter within clear aperture of a beam shaping device objective lens. Meeting the standards for the circle positioned in the area where the intensity reaches its maximum, results in the intensity being significantly below the permissible limit in other parts of an output beam cross-section. In this case total power that may be transmitted through a beam shaping device is many times lower than in the case when intensity distribution is uniform over a clear aperture of the device's objective lens.

Averaged intensity distribution over speckles in a multimode fiber cross-section and in the optical radiation angular spectrum at the fiber output may be made uniform by uniform excitation of the fiber modes. A device is known, which is intended for creation of a nearly uniform power distribution among the modes of an optical fiber; the main part of the device is a helix formed by several turns of the optical fiber winded on a cylindrical mandrel (see U.S. Pat. No. 4,998,792 to Boerstler et al.). A disadvantage of the known device is that it does not provide required in practical applications level of uniformity in excitation of all fiber modes, including the high-order ones. The few turns of the helix do not provide an efficient excitation of high-order modes, because the fiber curvature in the helix shall not considerably exceed a critical value depending on the refraction indices of the fiber core and cladding. Otherwise, if the helix curvature is large (the radius of curvature is materially less than the critical one), the energy exchange between modes ("mode mixing") and excitation of high-order modes are successfully achieved, but light reflection from the core/cladding dividing surface is too weak to hold the radiation inside the fiber core.

A device is known which is partly free from the above disadvantages (see U.S. Pat. No. 4,934,787 to Ichimura et al). In this device, an optical fiber is wound around two or more cylinders, so that the loops are forming figure-eights. In this case, the loop curvature providing an efficient energy exchange between the fiber modes, is slightly less than in the Boerstler et al. arrangement.

The preferred helix dimension in the Boerstler et al. system is approximately 20 mm, while in the Ichimura et al. system it is about 40 mm. The radiation power loss in the optical fiber is thereby less in Ichimura et al. than in Boerstler et al., but still is considerable. Besides this, as the cylinder diameter in the known Ichimura et al. device is several tens of millimeters, and there are at least two such cylinders, the device is cumbersome. A further disadvantage of the Ichimura et al. approach is its low manufacturing effectiveness, because to wind the loops it is necessary to use manual labor requiring focused attention, or to create special automatic machines.

Near to the claimed device in its technical essence is the device known from the description of the Japanese patent application PN 60-178409 (AN 59-035575) to Hideki et al. The known device is a housing in which an optical fiber is fastened by special clamps providing its twisting and multiple lateral bents.

A disadvantage of the known Hideki et al. device is that a few clamps do not provide efficient excitation of high-order modes necessary to obtain a uniform average distribution of radiation intensity within the beam cross-section and within its angular spectrum, while increase in the clamps number causes respective increase of the device dimensions, making it impractical.

Hence a need exists for a technique for effectively producing multiple modes in the multimode fiber and attendant uniformity of intensity, in a manner which is practical for application in supplying optical communication signals to an antenna of a free-space optical communication system.

Specifically, there is a need for a device that provides uniformity of intensity distribution in the beam cross-section as well as within its angular spectrum, minimizes the dimensions of the beam generating and shaping device and limits noise caused by speckles at a remote photodetector input below maximum permissible value.

SUMMARY

Systems proposed herein provide average uniformity of the intensity distribution in a receive aperture plane and also eliminate influence of speckles on optical communication system operation.

The systems provide uniformity of intensity distribution in the beam cross-section as well as within its angular spectrum at emission, and such systems minimize the beam shaping device dimensions and limit noise caused by speckles at a remote photodetector input below maximum permissible value.

Advantageous results are achieved by using a beam generating and shaping device with a multimode fiber optically coupled to a telescope, with properly selected system parameters and equipped with means for launching multiple modes and means for exchange of energy between modes propagating through the fiber.

In one aspect, the beam generating and shaping device for a free-space optical system comprises: 1) a radiation source, 2) a multimode optical fiber with means providing energy exchange between modes and therefore multiplication of modes initially excited in the fiber, 3) placed between the radiation source and optically coupled to the radiation source fiber cross-section means for coupling into the fiber of a radiation beam having extended angular spectrum, and 4) a telescope optically coupled to second cross-section of the fiber and providing required concentration of optical radiation output from the fiber at a receive aperture of a remote receive terminal.

In another aspect, the concepts herein provide a free-space optical communication system, an input for an information signal and a beam generating and shaping device. The shaping and generating device includes a source of optical radiation bearing the information signal and a multimode optical fiber. An optical coupler between the source and the proximal end of the multimode optical fiber introduces radiation from the source into the proximal end so as to launch a substantial number of modes within the multimode optical fiber. The system also includes a mode mixer, engaging a portion of the multimode optical fiber between the proximal end and the distal end. An optical antenna is coupled to the cross-section formed by the distal end of the multimode optical fiber, for transmitting radiation emitted from the distal end of the multimode optical fiber over a free-space optical link.

An exemplary mode mixer consists essentially of a single clamp, providing micro-bending of the multimode optical fiber. In disclosed embodiments, the single clamp comprises a flat metal plate and a rod engaging the jacket of the multimode optical fiber at a point along the multimode optical fiber. A force applied by the rod to the multimode optical fiber through the jacket toward the flat metal plate, deforms the jacket and provides the micro-bending of the multimode optical fiber.

In one example, the means for coupling optical radiation emitted from the radiation source into the optical fiber is implemented as a lens having an aperture exceeding the radiation beam lateral dimensions and installed so that the center of the beam from the radiation source does not coincide with the lens center.

The means for coupling of radiation into the optical fiber may be implemented as a lens having an aperture exceeding the radiation beam lateral dimensions at least twice in at least one coordinate, installed so that the light beam from the radiation source is illuminating the lens between its center and its edge.

The lens is implemented with a numerical aperture equal to the numerical aperture of the fiber, while the distance between the center of the beam, illuminating the lens between its center and its edge, and the lens center is equal to half of the lens radius.

In another example, the means for beam coupling into the fiber is implemented as a lens and an optical wedge, both placed one after another along the beam path.

The lens placed between the radiation source and the optical wedge is implemented with a numerical aperture equal to half of the optical fiber numerical aperture, while the optical wedge is implemented with a wedge angle providing an inclination of the axis of the beam entering the optical fiber relative to the fiber axis, which is equal to half of the fiber numerical aperture.

In an example, the fiber cross-section optically coupled to the telescope is placed in the area optically conjugated with the receive aperture of a remote receive terminal relative to the telescope objective lens.

The exemplary beam generating and shaping device is implemented with a fiber having core diameter d satisfying the equation d/F=H/L, where:

d>δ;

δ—lateral dimension of a point-spread-function that would be formed in the area of the fiber cross-section location by the telescope objective lens from a light beam with plane wavefront;

F—telescope objective lens focal length;

H—required illuminated spot diameter in a receive aperture plane of a remote receive terminal, cm;

L—distance from the telescope objective lens to the receive aperture, cm;

L>>F.

Advantages also are achieved by implementation of the device with a multimode fiber having numerical aperture φ satisfying the inequality φ≦A, where:

A=R/F—telescope objective lens numerical aperture, rad;

R—telescope objective lens radius, cm;

R/F≦0.4.

Further advantages may be achieved by implementation of the device with a multimode fiber having numerical aperture φ satisfying the inequality $\phi \geq (\lambda KL)/(3\sqrt{2}*DF)$, where:

λ—wavelength of optical radiation used in a free-space optical system, cm;

K—required minimum signal-to-noise ratio at the input of a remote receive terminal photodetector;

D—remote receive terminal receive aperture diameter, cm.

Advantages also may be achieved by installation of one or several auxiliary lenses between the fiber cross-section that is optically coupled to the telescope and the telescope objective lens. The one or more auxiliary lenses form an image of the fiber cross-section with magnification coefficient M in the area optically conjugated with a receive aperture of a remote receive terminal relative to the telescope objective lens.

Advantages also may be achieved by installation of the optically emitting cross-section of the fiber at a location between the telescope objective lens and its focal surface at the distance $S=f(M-1)^2/M$ from this surface. This arrangement uses one auxiliary lens with a focal value f installed at the distance $S'=f(M-1)$ from the surface, where $f<F/(M-1)$ and focal length of the telescope objective lens satisfies the condition $F<<L$.

In disclosed examples using the auxiliary lenses (or lens), the device preferably is implemented with a fiber having core diameter d satisfying the equation $dM/F=H/L$, where: $dM>\delta$.

In the examples using the auxiliary lenses (or lens) advantageous results are also achieved by implementing the device with a multimode fiber having a numerical aperture $\phi$ satisfying the inequality $\phi/M \leq A$, where: $R/F \leq 0.4$.

For example, the device the using auxiliary lenses (or lens) may be implemented with a multimode fiber having a numerical aperture $\phi$ satisfying the inequality $\phi/M \geq (\lambda KL)/(3\sqrt{2}*DF)$.

The device using the auxiliary lenses (or lens) may also be implemented with a multimode fiber having a numerical aperture $\phi$ satisfying the equation $\phi/M=A$.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
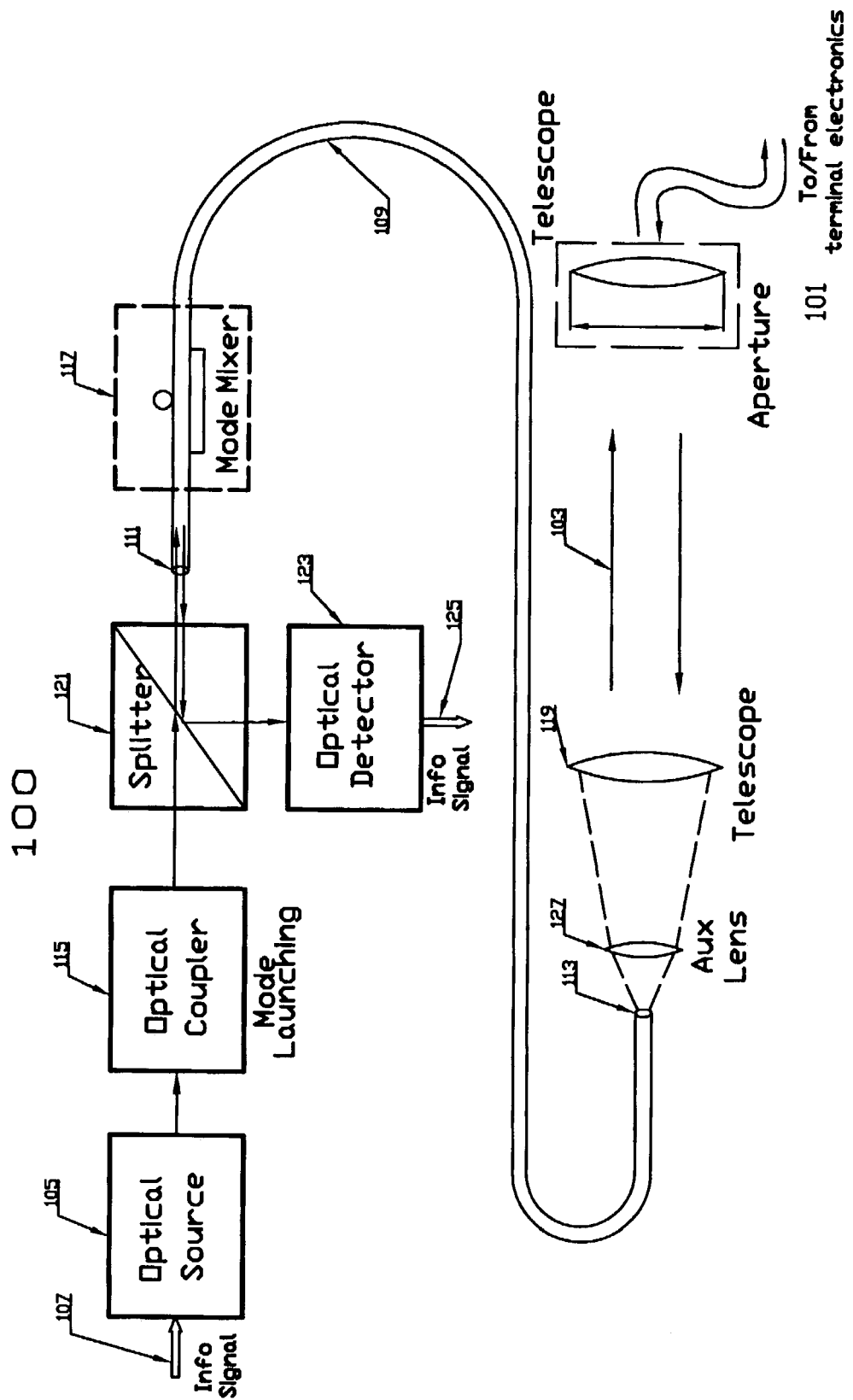
FIG. 1 is a functional block diagram of a free space optical communication system and a remote terminal.

Concepts discussed herein relate to beam generating and shaping, particularly as might be used in transmitting signals over a free space optical communication link. The communication system may be a one way system or a transceiver providing two-way communication. FIG. 1 is a high-level block diagram of a transceiver 100 and remote terminal 101, for communicating across a free-space optical link 103. The terminal 101 may be similar to the transceiver 100, or the remote terminal may be embodied in other forms.

As shown in the example of FIG. 1, the free-space optical communication system 100 includes a source 105 of optical radiation. The source 105 is responsive to an information signal input to the source at 107, so as to produce optical radiation bearing the information signal, intended for communication across the link 103 to the remote terminal 101.

The source 105 may be a light emitting diode or the like. Alternatively, the source may be the end cross-section of a fiber link to a remote optical interface, for example, connected to customer premises electronic equipment. In the example, the source 105 is a semiconductor device for emitting a modulated laser beam. The laser device may produce a beam in the invisible or visible part of the spectrum, for example, with a 785 nm wavelength. Those skilled in the art will be familiar with various techniques for modulating the information signal 107 onto the laser beam produced by the source 105.

The exemplary free-space optical communication system 100 also includes a multimode optical fiber 109. For discussion purposes, the fiber may be considered as having a proximal end 111 and a distal end 113. The distal end 113 of the multimode optical fiber 109 forms a cross-section for emitting radiation in the transmit direction.

The system 100 also includes an optical coupler 115 between the source 105 and the proximal end 111 of the multimode optical fiber 109. In the transmit direction, the optical coupler 115 is configured to introduce radiation from the source 105 into the proximal end 111 so as to launch a multitude of optical modes within the optical fiber 109. A mode mixer 117 engages a portion of the multimode optical fiber 109, at a location between the proximal end 111 and the distal end 113. The mode mixer 117 provides energy exchange between modes and therefore multiplication of the modes initially excited within the fiber 109.

In preferred embodiments, the mode mixer 117 consists of a single clamp for providing mico-bending at a point along the fiber. An example of such a mode mixer will be discussed later, with respect to FIG. 5.

The exemplary free-space optical communication system 100 also includes an optical antenna, for example in the form of telescope 119, coupled to the cross-section formed by the distal end 113 of the multimode optical fiber 109. The telescope 119 may comprise one or more lenses, but those skilled in the art will recognize that the telescope may be thought of as an objective lens for the system 100. In the transmit direction, the telescope 119 focuses radiation emitted from the distal end cross-section 113 of the fiber 109 for transmission over the link 103 to the remote terminal 101. The terminal 101 will typically have a telescope or other objective lens for collecting and concentrating radiation and supplying that radiation to associated electronics, for demodulation and information processing.

In the receive direction, the telescope 119 couples received radiation into the distal end 113 of the fiber 109. The mixer 117 essentially passes the received radiation without deterioration of the signal. A splitter 121 couples the received radiation to an optical detector 123. The detector is responsive to the received radiation for demodulating the radiation to recover an information signal transmitted by the remote terminal and supply the recovered information signal to other system components (not shown) for further processing. In the transmit direction, the splitter 121 passes the optical radiation from the coupler 115 to the proximal end 111 of the fiber 109.

In the example, the free-space optical communication system may also include one or more auxiliary lenses, one of which is shown at 127 in FIG. 1. In the transmit direction, the lens 127 provides magnification of the cross-section 113 with respect to the telescope 119. The fiber cross-section 113 is positioned relative to the telescope 119 objective lens so as its magnified image is optically conjugated with the receive aperture of the remote receive terminal 101. The addition of the lens 127 essentially enlarges the image of the cross-section 113 by the magnification factor M. The magnified image acts as an extended radiation source for emitting radiation for transmission through the telescope 119. In the receive direction, the lens 127 also helps to expand the optical field of view of the system 100. Details of the function of the lens 127 will be discussed in greater detail later, with respect to FIG. 6.

A variety of different optical couplers may be used as the mode launching coupler 115. Preferred embodiments utilize techniques for coupling the transmit beam from the source 105 (received via the splitter 121) into the multimode optical fiber 109 at a slant or inclination angle with respect to the longitudinal axis of the fiber 109. The point of coupling at the face of the distal end 111 of the fiber also may be offset from the axis of the fiber 109, for example by as much as one-third or one-half the radius of the fiber 109.

Placement between the radiation source 105 and the fiber cross-section 111 of means for coupling 115 into the fiber of a radiation beam having an extended angular spectrum at a slant angle to the fiber axis allows excitation of a considerable number of modes in the optical fiber. See, for example, PCT No. 99/24856 to Donhowe et al., where a radiation beam with an extended angular spectrum is formed via transmission of the radiation from a radiation source with negligibly small lateral dimensions through a positive lens with its axis slanted relative to the fiber axis.

A preferred implementation of such mode launching means shall comprise a lens having an aperture exceeding the radiation beam lateral dimensions in at least one coordinate, installed so that the center of the beam emitted from the radiation source does not coincide with the lens center.

In this case the lens' axis may be made parallel to the fiber's axis, and a slanted angle is formed via lateral shifting of a center of the beam from the radiation source relative to the lens center. In this implementation reflection of the radiation back into the radiation source from the lens surface is minimum. This is important, as radiation sources such as lasers are highly sensitive to back-reflection. Also in such implementation it is easy to vary the slant angle by varying distance between the centers of the beam cross-section and of the lens.

However, experiments made by the author of this application with different coupling means demonstrated that excitation efficiency of the fiber modes is thereby still different. As a result, the light intensity distribution within the beam cross-section and within the angular spectrum is not sufficiently uniform at the fiber output. Intensity maximum is observed around the fiber cross-section center, and the angular spectrum exhibits separate ring-shaped maximums (although the rings may not be continuous).

The intensity distribution uniformity may be further improved if the means for coupling of the radiation beam into the fiber is implemented as a lens having a numerical aperture equal to the fiber numerical aperture while the distance between the center of the beam illuminating the lens between its center and its edge and the lens center is equal to half of the lens radius.

In this case the radiation beam numerical aperture (half of the beam rays convergence angle) after the lens is equal to half of the fiber numerical aperture, and the beam axis inclination angle relative to the fiber axis is equal to half of the fiber numerical aperture.

Experiments made by the author of this application show that fiber modes are excited in this case more efficiently. With such a configuration of the means for coupling of the beam into the fiber, distribution of power between modes is made more uniform, but an intensity minimum in the center of the fiber and ring-shaped intensity non-uniformity in the angular spectrum is still observed.

It is also possible to implement the means for coupling of the radiation beam into the fiber as a lens and an optical wedge placed one after another along the beam path. It is advisable thereby to implement the lens placed between the radiation source and the optical wedge with a numerical aperture equal to half of the fiber numerical aperture, and to implement the optical wedge with a wedge angle providing an inclination of the axis of the beam entering the optical fiber relative to the fiber axis equal to half of the fiber numerical aperture.

Like in the previous implementation of the means for coupling of the beam into the fiber, the optical beam numerical aperture at the fiber input is thereby equal to half of the optical fiber numerical aperture, and the inclination of the beam axis relative to the fiber axis is also equal to half of the fiber numerical aperture.

Using of optical components forming at the fiber input a converging beam with a numerical aperture nearly equal to half of the fiber numerical aperture while the beam axis inclination relative to the fiber axis is also equal to half of the fiber numerical aperture, allows reduction in the contrast of intensity non-uniformity in the beam's angular spectrum, as well as an increase in intensity in the center of the fiber. But these measures do not provide a uniform filling of the total fiber cross-section and its numerical aperture with optical radiation.

Attempts to further increase the beam numerical aperture and the beam inclination at the fiber input relative to the fiber axis are resulting in a further improvement of the fiber cross-section and numerical aperture filling with radiation, but also cause a simultaneous rapid increase of radiation loss at its coupling into the fiber. There is no sufficiently uniform mode excitation even with loss exceeding 70% of the radiation power.

At the other hand, as has been observed in the experiments made by the author, an installation of means providing energy exchange between fiber modes ("mode mixing") in addition to means for radiation coupling providing a slant beam with a continuous spectrum ("mode excitation") provides a highly uniform intensity distribution within the beam cross-section as well as within the beam angular spectrum without a considerable loss of radiation. This is because the modes efficiently excited at the fiber input, exchanging energy with less excited modes, are increasing the power of such modes.

It is important to note that simple and compact means for mode mixing, implemented as a bending clamp proposed in this patent application, does not in itself provide a uniform filling-in of the fiber cross-section and of the angular spectrum by radiation, without the use of means for radiation coupling into the optical fiber mentioned in the application.

As has been proven in the experiments performed by the author of the application, these taken separately mode mixing means also do not provide the required uniformity of the fiber filling-in, even if two or three such mode mixing devices are installed one after another. In the Hideki et al. device, a large number of bending clamps was necessary; besides this, the fiber had to be twisted along its axis to achieve a uniform filling-in of the fiber with optical radiation.

At the same time, the above mentioned mixing means installed after the means for coupling into the optical fiber of a radiation beam with an extended angular spectrum at a slant angle relative to the fiber axis, provide a highly uniform distribution of the light intensity within the beam cross-section and within the angular spectrum. Thus, the combination of the means for mode excitation and for mode mixing results in a positive effect, which cannot be achieved by separate use of these means.

Placing the fiber cross-section optically coupled to the telescope in the area optically conjugated with the receive aperture of a remote receive terminal relative to the telescope objective lens ensures uniformity of averaged over speckles intensity distribution in the receive aperture plane, as in such case in the receive aperture plane an image of the fiber cross-section uniformly filled with light is built by the telescope objective lens.

Using a multimode fiber having core diameter d satisfying the equation d/F= H/L, where:

d>δ;

δ—lateral dimension of a point-spread-function that would be formed in the area of the fiber cross-section location by the telescope objective lens from a light beam with plane wavefront;

F—telescope objective lens focal length;

H—required illuminated spot diameter in a receive aperture place of a remote receive terminal, cm;

L—distance from the telescope objective lens to the receive aperture, cm;

L>>F, allows to make a diameter of uniformly illuminated spot in the receive aperture plane equal to H.

It should be noted, that if the condition d>δ was not met, lateral sizes of the illuminated area in the receive aperture plane would not depend on d but rather would have been determined by the equation δ/F=H/L, at least for L>>F, which is always the case in practical applications. The reason for that is that for d<δ variation of lateral position of intensity distribution corresponding to different light-emitting points in the fiber cross-section is insignificant compared to δL/F.

Using a multimode fiber having numerical aperture δ satisfying the inequality $\phi \leq A$, where:

=R/F—telescope objective lens numerical aperture, rad;

R—telescope objective lens radius, cm;

R/F≦0.4, allows avoidance of losses of optical radiation when it passes through the telescope objective lens, as optical beam radius equal to φF on the objective lens does not exceed the lens radius in this case.

Using a multimode fiber having numerical aperture satisfying the inequality $\phi \geq (\lambda KL)/(3\sqrt{2}*DF)$, where:

λ—wavelength of optical radiation used in a free-space optical system, cm;

K—required minimum signal-to-noise ratio at the input of a remote receive terminal photodetector;

D—remote receive terminal receive aperture diameter, cm, allows a decrease in noise caused by speckles at the input of a remote receive terminal photodetector to P/K, where P is average optical signal power, K—minimum permissible signal-to-noise ratio.

Let us consider in more detail the latter requirement to a multimode fiber numerical aperture. In V. V. Ragulskyi, V. G. Sidorovich, On Aperture Averaging of Speckle Patterns, Optics and Spectroscopy, #2, vol. 94, 2003, it has been experimentally and theoretically proven that $\sigma/<P> = \sqrt{2/3}*(\lambda L/\Omega D)$, where σ/<P>—optical signal standard deviation at the input of a photodetector in the absence of background radiation; σ—square root of the signal dispersion; <P>—average signal power, Ω=2r—beam diameter at the telescope objective lens output. The said signal dispersion may be caused by effects in a multimode fiber (so called "modal noise", see above-cited Bristow et al. patent), as well as by atmospheric effects (see above-cited V. V. Ragulskyi, V. G. Sidorovich., article).

As far as K=<P>/σ and Ω=2r=2φF, it can be derived from the above expression that $K = 3\sqrt{2}*(\phi DF)/(\lambda L)$. It follows from here that in absence of background radiation a signal-to-noise ratio excess above K is ensured if the following condition is met by the fiber numerical aperture: $\phi \geq (\lambda KL)/(3\sqrt{2}*DF)$. It should be noted that background radiation, such as scattered sunlight, is negligible in practical applications, as it is blocked before the input of a photodetector by narrowband interference filters and other chromatic optical elements (see U.S. Pat. No. 4,960,315 to Kostal et al.).

In the examples, an auxiliary lens provides magnification of the image of the fiber cross-section acting as an extended light source. One or several auxiliary lenses are installed between optically coupled to the telescope fiber cross-section and the telescope objective lens. The auxiliary lens or lenses form an image of the fiber cross-section with magnification coefficient M in the area optically conjugated with a receive aperture of a remote receive terminal, relative to the telescope objective lens. The addition of the auxiliary lens(es) allows for variation in lateral dimensions of the fiber cross-section image acting as an extended radiation source and to variation in such source's numerical aperture.

The fiber cross-section is positioned between the telescope objective lens and the focal surface of the telescope objective lens at the distance $S=f(M-1)^2/M$ from this focal surface using one auxiliary lens. The one auxiliary lens has a focal value f, and that lens is installed at a distance S'=f(M−1) from the focal surface of the telescope objective lens, where f<F/(M−1) and focal length of the telescope objective lens satisfies the condition F<<L. Such an installation of the lenses makes the device simple and also compact, as the auxiliary lens as well as the fiber cross-section are both located between the telescope objective lens and its focal surface.

Implementation of the device with a fiber having core diameter d satisfying the equation dM/F=H/L, where: dM>δ, allows varying H values by changing M and using multimode fibers with identical d values.

Implementation of the device with a multimode fiber having numerical aperture φ satisfying the inequality φ/M≦A, where: R/F≦0.4, prevents loss of optical radiation at its transmission through the telescope objective lens.

Suppression of noise at the photodetector input is achieved by implementation of the device with a multimode fiber having numerical aperture φ satisfying the inequality $\phi/M \geq (\lambda KL)/(3\sqrt{2}*DF)$.

The same fiber that is coupled to the radiation source, may also be coupled at the source end to a photodetector through a beamsplitter. The splitter splits transmit and receive channels and protects the photodetector from radiation emitted by the radiation source. This arrangement allows the use of the same multimode fiber as well as same telescope, to transmit and receive optical radiation from a remote terminal.

The mode mixing means installed on the fiber just provide exchange of energy between the fiber modes and do not make any negative impact on optical signal borne by optical radiation captured by the telescope objective lens and propagating through the fiber towards the photodetector. The mode excitation means belong to the transmit channel and also can not influence the received optical signal in any way.

At the other hand, in the receive mode of the device operation, auxiliary lenses positioned between the telescope objective lens and the fiber cross-section and building a magnified image of the fiber cross-section may be useful in many applications. Indeed, optical radiation from a remote terminal may be spread in the focal surface of the telescope objective lens over the entire magnified image of the fiber cross-section to be captured by the fiber without loss. This means that angular field-of-view of the receive channel is equal to Md/F in this case compared to d/F in the absence of the auxiliary lenses.

Use of auxiliary lens (lenses) installed between the receive telescope objective lens and the fiber coupled to the telescope may provide significant expansion of wireless optical system receive field-of-view. In one of the systems developed by Sunflower Technologies, the assignee of this application, the receive field of view was increased by 2 times, from 2.5 milliradian to 5 milliradian at cost of one additional lens installed between the receive fiber and the telescope lens. This allowed a significant increase in tolerance of the system to movement of buildings or other supporting structures.

To avoid loss of optical power in a transmit as well as in a receive modes of the beam shaping device operation it is advisable to implement the device with $\phi/M=A$. In this case all light rays emitted from the fiber cross-section optically coupled to the telescope pass through the objective lens without obstruction and also all light rays from a remote terminal collected by the lens are captured by the fiber and delivered to its cross-section coupled to the radiation source and the photodetector.

Figure 2:
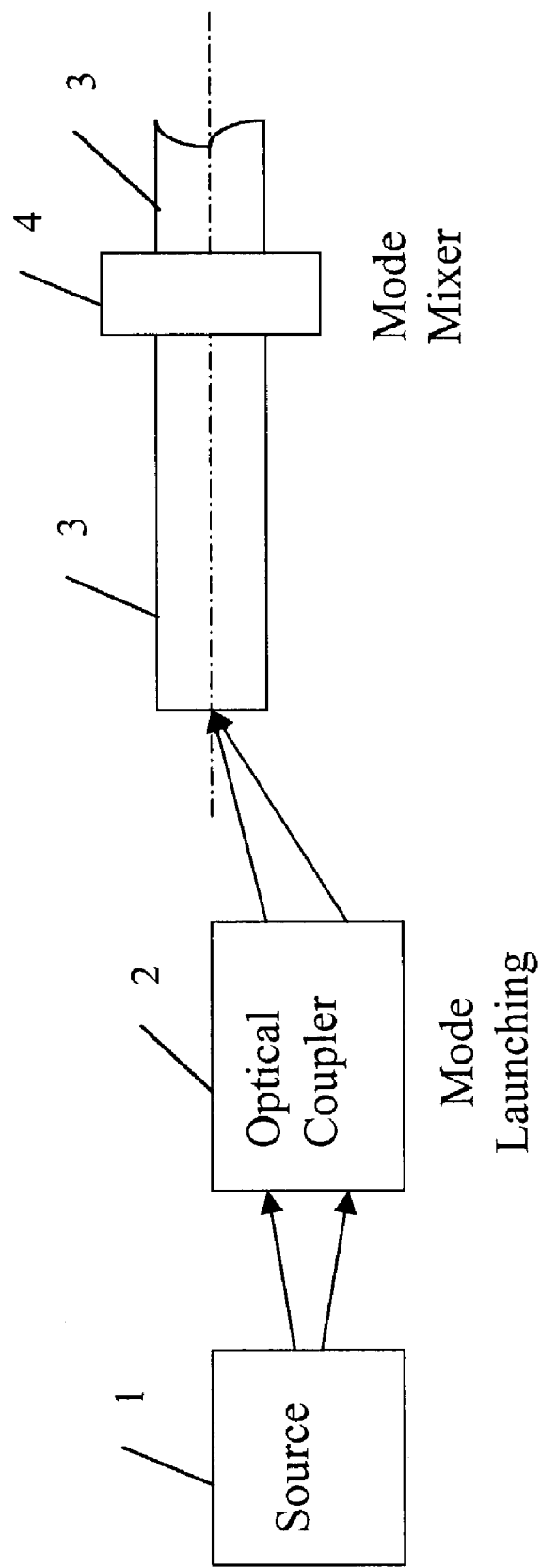
FIG. 2 is a functional diagram useful in explaining mode launching at an inclined angle and mode mixing.

The essence of the claimed device is made clear by examples of its implementation as well as by drawings. In FIG. 2, a part of the device block diagram associated with uniform excitation of fiber modes is shown; in FIGS. 3 and 4, particular implementation versions of this part are schematically shown; in FIG. 5 particular version is shown of implementation of means providing multiplication of modes initially excited in the optical fiber.

Figure 6:
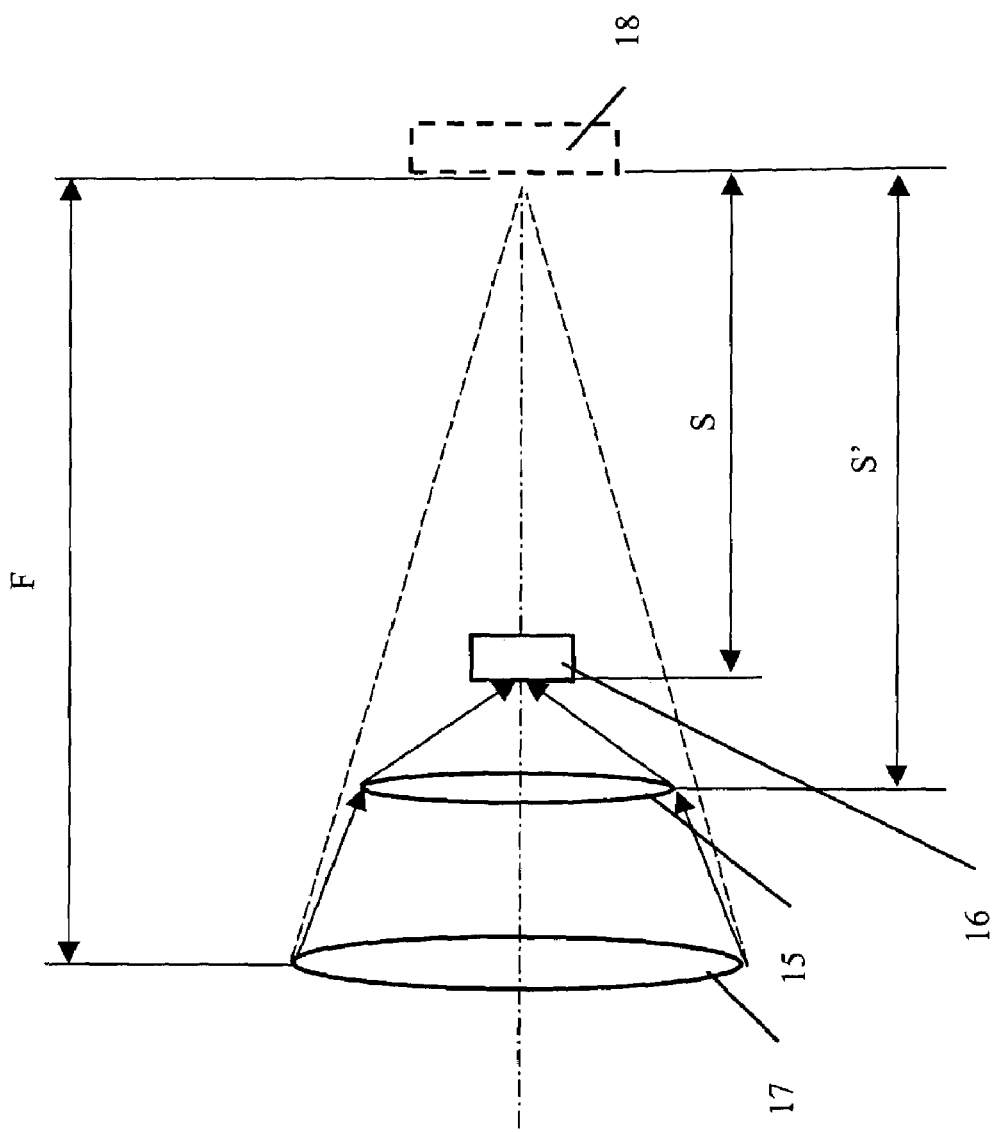
FIG. 6 is an optical diagram useful in explaining the relative locations and coupling of the fiber cross-section to the objective lens of the telescope via an auxiliary lens.

In FIG. 6 the auxiliary lens 15 is installed between optically coupled to the telescope fiber cross-section 16 and the telescope objective lens 17. The auxiliary lens builds a magnified image 18 of 16 in the telescope focal surface. This figure is equally applicable to transmit and receive modes of the telescope operation.

In a first example (see FIG. 2), a beam generating and shaping device comprises a radiation source 1, means 2 for coupling of the radiation beam having an extended angular spectrum into the optical fiber 3 at a slant angle relative to its axis, and means 4 for multiplication of modes initially excited in the fiber, due to the energy exchange between the modes.

The source 1 could be a light emitting diode (LED) but typically is a semiconductor laser light source. The device operates in the following way. The light beam from the source 1 is guided to the means 2 transforming the initial beam into a beam having an extended angular spectrum and providing its coupling into the fiber 3 at a slant angle. As a result, a large number of modes are excited in the optical fiber. Due to the means 4, modes efficiently excited at the fiber input exchange energy with less excited modes and increase the power of such modes, thus providing uniformity of the light flux over the beam cross-section and uniform distribution of intensity over the beam angular spectrum at the fiber output.

As another example (see FIG. 3), in a particular case, the device comprises a radiation source 1, means 2 for coupling of the light beam into the optical fiber 3 at a slant angle, implemented as a collimating lens 5, a focussing lens 6 placed after the lens 5, and an optical wedge 7.

In the experiments, radiation was used of a semiconductor laser with a wavelength=785 nm.

The light beam after the collimator (lens, in the focal point of which the laser was installed) had a flat wavefront and an oval cross-section shape with lateral dimensions 4.4×1.9 mm (at a 1% intensity level). As a device for coupling of radiation into the optical fiber, a lens was used with a free aperture of 4.4 mm and a focal length of 10 mm. The beam center was in the lens center. The lens optical axis was parallel to the optical fiber axis.

An optical wedge made of glass with a refraction index of 1.5 and a wedge angle of 16° has been placed between the lens and the optical fiber.

The optical fiber was a step-index one, with a core diameter of 100 m and a numerical aperture of 0.22.

Figure 5:
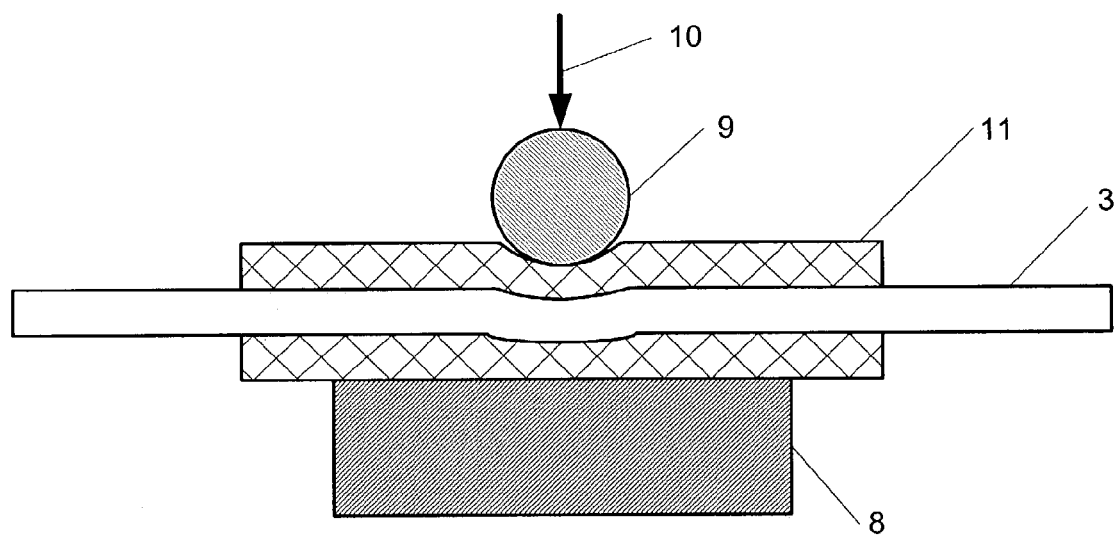
FIG. 5 is a cross sectional view of an exemplary fiber clamp used as a mode mixer.

As shown in FIG. 5, the mode mixer consists of a single clamp arrangement, providing micro-bending of the portion of the multimode optical fiber. It has been found that without a mode mixing device it is impossible to obtain a uniform filling-in of the beam cross-section and of the beam angular spectrum at the output of a several-meter-long optical fiber. A variation of the wedge angle and use of a lens with a different numerical aperture could only make the filling-in less uniform and cause additional loss of radiation power.

The mode mixing means 4 was implemented as a flat metal plate 8 (FIG. 5) to which the optical fiber 3 was pressed by a 8-mm-diameter metal rod 9 positioned across the fiber (the pressing force was applied to the rod 9 by known means, e.g. brackets with control screws, C-clamps, clips, etc). The pressing force is symbolically shown at the drawings by the arrow 10). The optical fiber 3 was covered with a relatively soft plastic jacket 11, which has not been removed when the fiber was passed through the clamp. Although not separately shown, for convenience, the fiber 3 comprises a core and a relatively rigid cladding.

The force 10 applied to the rod 9 provides local bending of the fiber, because the deformable jacket material 11 between the fiber 3 and the clamp metal plate was caved in. The caving depth depended on the force applied to the rod, and the fiber and jacket parameters. The deformation of the fiber 3 may be considered as forming three curves. From right to left in the drawing, the first curve would be downward from the horizontal, the second curve would provide a reversal (from downward to upward), and the third curve would round back to the horizontal, in the exemplary orientation. Varying the force 10 in experiments, it was possible to obtain a uniform filling-in of the beam cross-section and its angular spectrum with radiation at the fiber output. The radiation loss did not exceed thereby 10 . . . 15%.

The proposed mode mixing means has been tested during fifteen weeks for stability of its parameters. No parameter degradation has been recorded. It should be also noted that using of rods 9 with a diameter less than 0.5 mm did not allow to obtain stable parameters of the mixing means, while at diameters more than 1 mm it was impossible to provide a uniform light distribution within the cross-section and angular spectrum of the beam output from the fiber. The mixing means has been placed at various distances, 10 cm to 200 cm, from the optical fiber cross-section where the mode excitation device has been placed. The result thereby, i.e. the uniformity of the beam intensity within the output cross-section and angular spectrum, was the same in all cases.

Those skilled in the art will recognize that other mode mixing arrangements may be used. As just one example of an alternative mixer, the means providing energy exchange between modes in the optical fiber may be also implemented as a wedge-like slot, the sides of which are formed by skewed end faces of a cut optical fiber. The slot is filled with Canadian balsam having a refraction index exceeding the fiber material refraction index.

Figure 3:
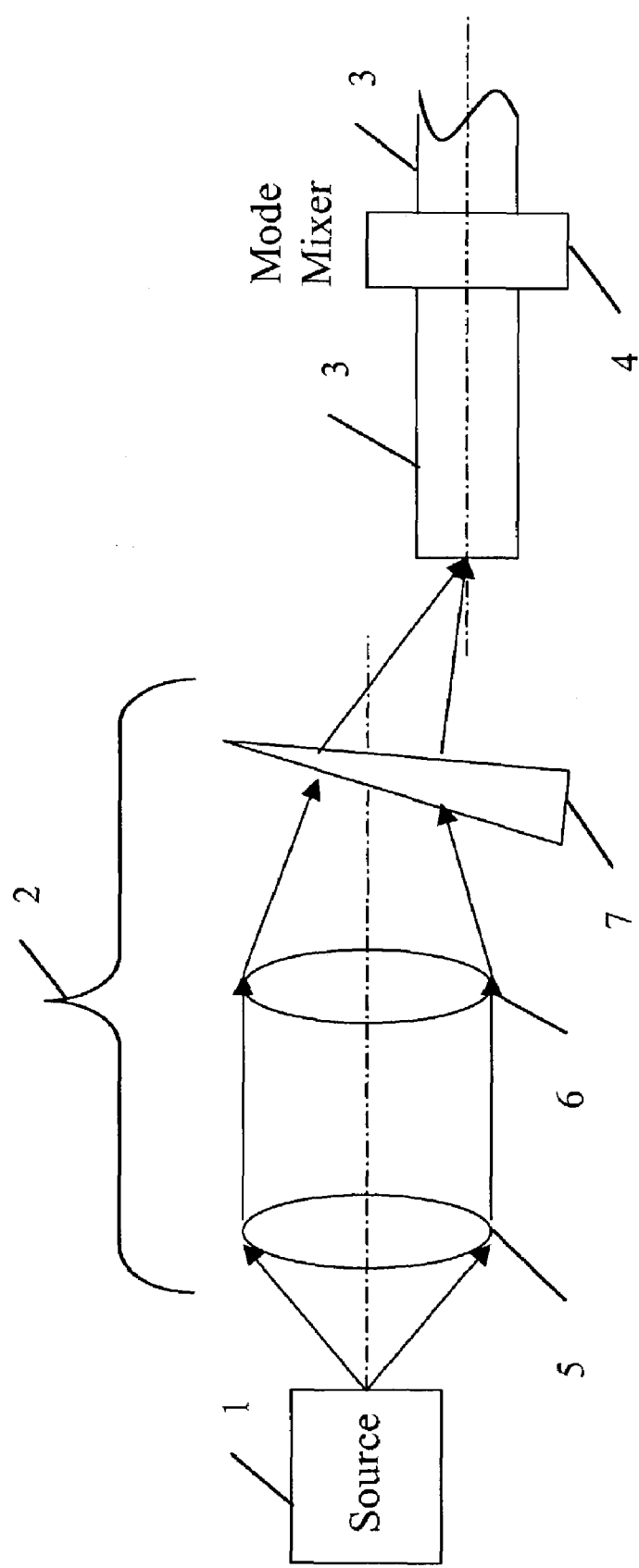
FIG. 3 is a functional diagram of an example of mode launching at an inclined angle.

As a third example (see FIG. 4), the device comprises a radiation source 1, a collimating lens 5, a focussing lens 6, and an optical fiber 3 with means 4 providing multiplication of modes initially excited in the fiber as shown in FIG. 3. Collimated radiation of a semiconductor laser with a wavelength of 785 nm has been used.

After the collimator (a lens, in the focal point of which the laser was installed) the light beam had an oval cross-section shape with lateral dimensions 4.4×1.9 mm (at 1% intensity level). As a device for coupling of radiation into the fiber, a lens was used with a free aperture diameter of 4.4 mm and a focal length of 10 mm. The beam cross-section center was laterally displaced by 1.2 mm relative to the lens center in the direction parallel to the short axis of the beam cross-section oval.

The beam center displacement relative to the lens center provided an inclination of the beam passed through the lens relative to the fiber axis parallel to the lens optical axis. No optical wedge has been thereby placed between the lens and the fiber. The optical fiber was a step-index one, with a core diameter of 100 $\mu$m, 200 $\mu$m, 400 $\mu$m, or 500 $\mu$m and a numerical aperture of 0.22.

It has been found that without a mode mixing device it is impossible to obtain an uniform filling-in of cross-section and angular spectrum of the beam at the output of a several-meters-long fiber. A variation of the lateral displacement of the beam oval cross-section relative to the lens, as well as using of lenses with different numerical aperture values, could only make the filling-in less uniform, or caused very significant loss of radiation power.

In all experiments made without the mode mixing means, the central part of the beam had a low level of filling-in by light. Also, in the experiments the angular spectrum consisted of several concentric ring-shaped areas where intensity was higher than in other areas.

The mode mixing means, like in the earlier example, was implemented as a flat metal plate to which the optical fiber was pressed by a metal rod 0.5 mm or 0.8 mm in diameter, fixed perpendicular to the fiber axis.

The optical fiber was covered with a plastic jacket, which has not been removed when the fiber was passed through the clamp. The force applied to the rod provided local bending of the fiber.

Varying the force, it was possible to obtain a uniform filling-in of the beam cross-section and angular spectrum with radiation. The total loss of radiation power in the mode excitation means and in the mode mixing means did not exceed 10 . . . 15%.

The proposed mode mixing means has been tested during fifteen weeks for stability of its parameters. No parameter degradation has been recorded.

Like in the preceding example, using of rods with a diameter less than 0.5 mm did not provide stable parameters of the mixing device, while at diameters more than 1 mm it was impossible to provide a uniform distribution of radiation within the cross-section and angular spectrum of the optical fiber output beam.

The distance between the mode excitation means and the mode mixing means has been varied from 10 cm to 200 cm. The optical fiber output beam uniformity was thereby equally good.

Figure 4:
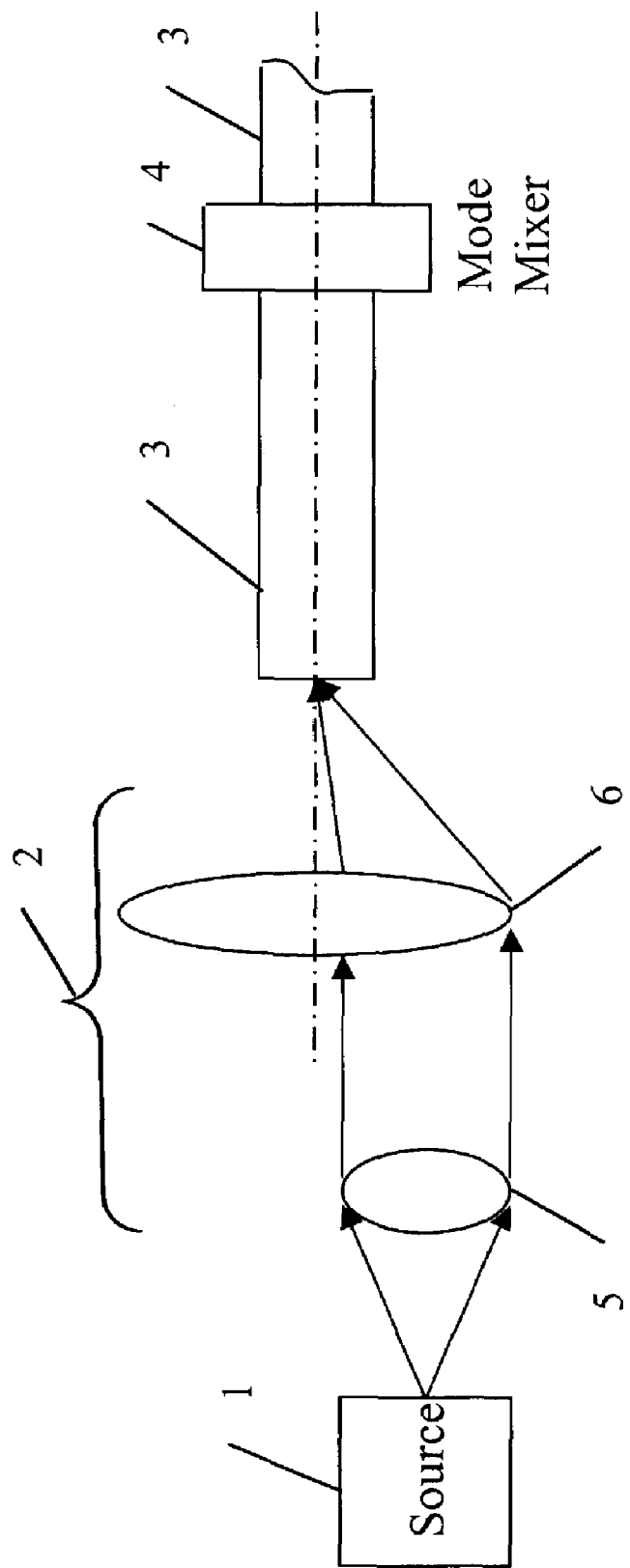
FIG. 4 is a functional diagram of another example of mode launching at an inclined angle.

It is important to note that the devices implemented in FIGS. 3, 4 and 5 are not only providing uniformity of the average (averaged over the speckles in the cross-section) values of intensity within the beam cross-section as well as within its angular spectrum, but are also transforming the oval-cross-section beam generated by many of the industrially produced semiconductor lasers into a beam having a circular cross-section in the near-field (at the telescope objective lens) and far-field (in the receive aperture plane) zones.

An advantage of the device implementation considered in the example of FIG. 4 as compared with the example of FIG. 3 is that the beam approaching the lens is displaced relative to its center, thus reducing the return glint (back-reflected beam power) coming from the lens center to the radiation source (for example, a semiconductor laser). Many of the practically used radiation sources are sensitive to such glints; in such cases the device implementation considered in FIG. 4 is preferable.

Let us now consider the case when it is required to create uniform average illumination within a circle with diameter H=100 cm in the receive aperture plane located at the distance L=500 m from the telescope lens with 5 cm diameter and focal value F=10 cm.

In accordance with the equation d/F=/L, this is achieved using a fiber with core diameter equal to 200 micrometers. The core diameter shall be 400 or 500 micrometers and should provide the same illumination spot diameter when implemented at operating distances equal to 250 or 200 meters, respectively.

Such fibers are available commercially, including with numerical aperture NA equal to 0.22 and 0.39. For NA=0.22 the condition $\phi \leq A$ is met for the telescope used in this example with focal length 10 cm and R=2.5 cm.

Installation of auxiliary lens 15 between the fiber cross-section 16 and the telescope objective lens 17 may allow using of a fiber with a 200 micrometer core and NA= 0.39 instead of the one with a 400 micrometer core and NA=0.22 to create a uniform illumination within a circle with a diameter H=100 cm at the distance of 250 meters.

Such replacement of a 400 micrometer fiber with a 200 micrometer may be allowed, for example, by installation of an auxiliary lens having f=5 mm at a 5 mm distance from the telescope objective lens focal surface and with a fiber cross-section positioned at a 2.5 mm distance from that surface.

In this case, a two-power magnification (magnified by 2 times or M=2) image 18 of the fiber cross-section is built in the telescope lens focal surface. The distance between the focal surface and an area optically conjugated with the receive aperture relative to the objective lens may be neglected if F<<L.

A magnified by 2 times image of a 200 micrometer fiber gives practically the same optical beam parameters at the telescope output as a 400 micron fiber directly coupled to the telescope. The only difference is that the beam is slightly narrower in the latter case, as 0.39/M<0.22.

Obviously, in practical applications it is preferable that numerical apertures of the fiber and the telescope are equal, i.e. $\phi=A$, as otherwise part of the telescope lens free aperture is not used for the radiation transmission. However, a slight difference between $\phi$ and A may be accepted. Let us calculate parameters of the device components providing the signal-to-noise excess above 10 in the absence of background radiation. Let us assume L=500 m, D=10 cm, F= 10 cm and widely used $\lambda$=785 nm. By entering those numbers into the formula $\phi \geq (\lambda KL)/(3\sqrt{2}*DF)$, the condition $\phi \geq 0.1$ is derived. This condition is met by commercial multimode fibers with $\phi=0.22$.

It follows from the above presented examples that the device may be implemented using commercially available multimode fibers, inexpensive telescopes, auxiliary lenses and other components that are simple in manufacture.

Also, it is important that the same beam generating and shaping device as it has been proposed in this application, may be also used to receive optical radiation from a remote terminal, if the coupled to the radiation source fiber cross-section is also coupled through a beam splitter to a photodetector. Optical isolation of a photodetector from the light source may be achieved by utilization of different wavelengths in optical radiation emitted by the radiation source and input from a remote terminal.

Possible configuration, where the same fiber is used to transmit and receive optical radiation is proposed in JP PN 10010354, G 02 B 6/24, 1998, [9], where a radiation source and a photodetector are provided with a common lens system as well as with means for selection of optical beams having different frequencies. The radiation source and photodetector are thereby optically coupled to an optical fiber end, while the selection means is implemented as two optical filters with a lens system between them.

In the case of a beam generating and shaping device used to receive as well as transmit optical radiation, the auxiliary lens proposed in this application expands a receiver channel field-of-view by M times, which is essential when structures supporting the beam shaping device do not provide for its high angular stability. By expansion of the receive channel field-of-view by M times tolerance of the receiver to angular instability is also increased by M times.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An optical beam generating and shaping device, comprising:
    a radiation source for producing optical radiation bearing information to be communicated to a remote receive terminal,
    a fiber link consisting of a single multimode optical fiber,
    means coupled to the radiation source for launching a beam of the optical radiation bearing the information having extended angular spectrum into a first cross-section of said multimode optical fiber, and for initially exciting a plurality of modes in said multimode optical fiber,
    mode mixing means engaging a portion of said multimode optical fiber between ends of said multimode optical fiber, for providing energy exchange between the fiber modes and therefore multiplication of the modes initially excited in the multimode optical fiber by the means for launching the radiation beam into the first cross-section of the multimode optical fiber, and
    a telescope objective lens optically coupled to a second cross-section of the multimode optical fiber and providing concentration of optical radiation output transmitted from the multimode optical fiber over a free-space optical link, as required at a receive aperture of the remote receive terminal, wherein the multimode optical fiber has core diameter d satisfying the equation d/F=H/L, where:
    $d > \delta$;
    $\delta$—lateral of a point-spread-function that would be formed in the area of the fiber cross-section location by the telescope objective lens from a light beam with plane wavefront;
    F—telescope objective lens focal length;
    H—require illuminated spot diameter in a receive aperture plane of the remote receive terminal, cm;
    L—distance from the telescope objective lens to the receive aperture, cm; and
    L>>F.

2. A device as in claim 1, wherein the means for launching a plurality of modes comprises means for coupling light from the source into the optical fiber at an angle of inclination with respect to the fiber axis.

3. A device as in claim 2, wherein the means for coupling light into the optical fiber comprises a lens having an aperture exceeding the radiation beam lateral dimension and installed so that the center of the beam from the radiation source does not coincide with the lens center.

4. A devices as in claim 2, wherein the means for coupling light into the optical fiber comprises a lens having an aperture exceeding the beam lateral dimensions at least twice in at least one coordinate, installed so that the light beam from the radiation source is illuminating the lens between its center and its edge.

5. A device as in claim 4, wherein the lens is implemented with a numerical aperture equal to the numerical aperture of the optical fiber, while the distance between the center of the beam, illuminating the lens between its center and its edge, and the lens center is equal to half of the lens radius.

6. A device as in claim 2, wherein the means for coupling light into the optical fiber comprises a lens and an optical wedge, both placed one after another along the beam path.

7. A device as in claim 6, wherein:
    the lens placed between the radiation source and the optical wedge is implemented with a numerical aperture equal to half of the optical fiber numerical aperture, and
    the optical wedge is implemented with a wedge angle providing an inclination of the axis of the beam entering the optical fiber towards the fiber axis, which is equal to half of the fiber numerical aperture.

8. A device as in claim 1, wherein the mode mixing means consists of a single clamp which is bending the fiber.

9. A device as in claim 1, wherein the second cross-section of the multimode optical fiber is placed in the area optically conjugated with the receive aperture of the remote receive terminal relative to the telescope objective lens.

10. A device as in claim 1, wherein the multimode optical fiber has numerical aperture $\phi$ satisfying the inequality $\phi \leq A$, where:

A=R/F—telescope objective lens numerical aperture, rad;
R—telescope objective lens radius, cm; and
R/F≦0.4.

11. A device as in claim 1, wherein the multimode optical fiber has numerical aperture φ satisfying the inequality φ≧(λKL)/(3√2*DF), where:
- λ—wavelength of optical radiation used in a free-space optical system, cm;
- K—required minimum signal-to-noise ratio at the input of a remote receive terminal photodetector; and
- D—remote receive terminal receive aperture diameter, cm.

12. A device as in claim 1, further comprising one or several auxiliary lenses between the second cross-section of the multimode optical fiber and the an objective lens of the telescope, the or several auxiliary lenses forming an image of the second cross-section of the multimode optical fiber with magnification coefficient M in the area optically conjugated with the receive aperture of the remote receive terminal relative to the telescope objective lens.

13. A free-space optical communication system, comprising an input for an information signal, and a beam generating and shaping device as in claim 1 responsive to the input information signal for transmitting input information via the concentrated optical radiation output.

14. An optical beam generating and shaping device, comprising:
- a radiation source for producing optical radiation bearing information to be communicated to a remote receive terminal,
- a fiber link consisting of a single multimode optical fiber,
- means coupled to the radiation source for launching a beam of the optical radiation bearing the information having extended angular spectrum into a first cross-section of said multimode optical fiber, and for initially exciting a plurality of modes in said multimode optical fiber,
- mode mixing means engaging a portion of said multimode optical fiber between ends of said multimode optical fiber, for providing energy exchange between the fiber modes and therefore multiplication of the modes initially excited in the multimode optical fiber by the means for launching the radiation beam into the first cross-section of the multimode optical fiber,
- a telescope optically coupled to a second cross-section of the multimode optical fiber and providing concentration of optical radiation output transmitted from the multimode optical fiber over a free-space optical link, as required at a receive aperture of the remote receive terminal, and
- one or several auxiliary lenses between the second cross-section of the multimode optical fiber and an objective lens of the telescope, the one or several auxiliary lenses forming an image of the second cross-section of the multimode optical fiber with magnification coefficient M in the area optically conjugated with the receive aperture of the remote receive terminal relative to the telescope objective lens, wherein:
- the second cross-section of the multimode optical fiber is installed between the telescope objective lens and its focal surface at the distance $S=f(M-1)^2/M$ from the focal surface, and
- the one or several auxiliary lenses comprises one auxiliary lens with a focal value f installed at the distance $S'=f(M-1)$ from the focal surface, where $f<F/(M-1)$ and focal length of the telescope objective lens satisfies the condition F<<L.

15. A device as in claim 14, wherein the multimode optical fiber has a core diameter d satisfying the equation dM/F=H/L, where: dM>δ.

16. A device as in claim 14, wherein the multimode optical fiber has a numerical aperture φ satisfying the inequality φ/M≦A, where: R/F≦0.4.

17. A device as in claim 15, wherein the multimode optical fiber has a numerical aperture φ satisfying the inequality φ/M≧(λKL)/(3√2*DF).

18. A device as in claim 14, wherein the first cross-section of the multimode optical fiber is also coupled to a photodetector through a beams splitter.

19. A device as in claim 14, wherein the multimode optical fiber has a numerical aperture φ satisfying the equation φ/M=A.

* * * * *